United States Patent
Li et al.

(10) Patent No.: US 12,129,913 B2
(45) Date of Patent: Oct. 29, 2024

(54) ELECTRIC DRIVE AXLE AND ELECTRIC VEHICLE

(71) Applicant: TOP GEAR POWERTRAIN TECHNOLOGY CO., LTD, Shanghai (CN)

(72) Inventors: Shan Li, Shanghai (CN); Yueyue Deng, Shanghai (CN); Jing Deng, Shanghai (CN); Hongxiang Yan, Shanghai (CN); Kun Xu, Shanghai (CN); Rongyue Liu, Shanghai (CN); Hongbo Wang, Shanghai (CN)

(73) Assignee: TOP GEAR POWERTRAIN TECHNOLOGY CO., LTD, Shanghai (CN)

( * ) Notice: Subject to any disclaimer, the term of this patent is extended or adjusted under 35 U.S.C. 154(b) by 0 days.

(21) Appl. No.: 17/921,185

(22) PCT Filed: Jun. 7, 2022

(86) PCT No.: PCT/CN2022/097261
§ 371 (c)(1),
(2) Date: Oct. 25, 2022

(87) PCT Pub. No.: WO2023/197428
PCT Pub. Date: Oct. 19, 2023

(65) Prior Publication Data
US 2024/0218919 A1  Jul. 4, 2024

(30) Foreign Application Priority Data
Apr. 14, 2022  (CN) .......................... 202210389100.2

(51) Int. Cl.
*B60K 17/16* (2006.01)
*B60K 17/08* (2006.01)
(Continued)

(52) U.S. Cl.
CPC .......... *F16H 37/046* (2013.01); *B60K 17/08* (2013.01); *B60K 17/165* (2013.01);
(Continued)

(58) Field of Classification Search
CPC .... F16H 2200/2005; F16H 3/52–3/666; F16H 3/091–093; F16H 2200/2064;
(Continued)

(56) References Cited

U.S. PATENT DOCUMENTS 9,822,860 B2 * 11/2017 Kaltenbach .............. B60K 1/00
10,272,765 B1 * 4/2019 Cho ........................ B60K 6/543
(Continued)

FOREIGN PATENT DOCUMENTS

CN        1358640 A      7/2002
CN        103692907 A    4/2014
(Continued)

OTHER PUBLICATIONS

Foreign OA dated Aug. 18, 2022 for CN 202210389100.2.
PCT/CN2022/097261 PCT ISR ISA210.

*Primary Examiner* — Ernesto A Suarez
*Assistant Examiner* — Lillian T Nguyen
(74) *Attorney, Agent, or Firm* — IPRO, PLLC; Na Xu

(57) ABSTRACT

The present disclosure relates to an electric drive axle, including a driving assembly, a power coupling gear, a first gear transmission assembly, a second gear transmission assembly and two half shafts connected by a differential, the driving assembly is used to drive the differential. In the above way, the electric drive axle and the electric vehicle realize 3 shifting speeds, and can timely engage in different speeds according to the vehicle load, road conditions, transportation time requirements, etc., so as to realize the efficient operation of the vehicle, improve the operation efficiency, reduce energy consumption, meet the power demand of
(Continued)

commercial vehicles with diverse loads and working conditions, and obtain high transportation efficiency and economic benefits.

18 Claims, 4 Drawing Sheets

(51) Int. Cl.
    *F16H 3/093*     (2006.01)
    *F16H 3/54*     (2006.01)
    *F16H 37/04*     (2006.01)
    *F16H 57/037*     (2012.01)
    *B60K 1/00*     (2006.01)

(52) U.S. Cl.
    CPC ...... *F16H 57/037* (2013.01); *B60K 2001/001* (2013.01); *F16H 2037/047* (2013.01); *F16H 2200/0021* (2013.01)

(58) Field of Classification Search
    CPC ........ F16H 2200/2094; B60K 1/00–02; B60K 17/046; B60K 2200/2035–2061
    See application file for complete search history.

(56) References Cited

U.S. PATENT DOCUMENTS

| | | | |
|---|---|---|---|
| 10,968,994 B2* | 4/2021 | Mittelberger | B60K 1/00 |
| 2020/0096084 A1* | 3/2020 | Engerman | F16H 3/006 |
| 2020/0378473 A1* | 12/2020 | Kim | F16H 1/46 |
| 2021/0206256 A1* | 7/2021 | Hwang | B60K 6/387 |

FOREIGN PATENT DOCUMENTS

| | | |
|---|---|---|
| CN | 103821897 A | 5/2014 |
| CN | 107985068 A | 5/2018 |
| CN | 109578533 A | 4/2019 |
| CN | 110385983 A | 10/2019 |
| CN | 110494314 A | 11/2019 |
| CN | 111365424 A | 7/2020 |
| CN | 111365425 A | 7/2020 |
| DE | 102017201174 A1 | 7/2018 |
| WO | 2021239507 A1 | 12/2021 |

* cited by examiner

ELECTRIC DRIVE AXLE AND ELECTRIC VEHICLE

FIELD OF THE INVENTION

The present disclosure relates to the technical field of automobiles, in particular to an electric drive axle and an electric vehicle.

BACKGROUND OF THE INVENTION

Weights of the cargo carried by commercial vehicles range from empty to 50, 60 tons, and the transportation road conditions are also various. In order to ensure the operating capacity and operating efficiency of the vehicle under various working conditions, it is necessary to ensure that the power outputs by the vehicle under different working conditions are various, such that not only a certain speed but also a high efficiency can be provided.

In the prior art, most of transmission systems of the electric drive axle have one single speed ratio, which cannot take into account both speed and traction at the same time. Some electric drive axles have two-speed transmission. Although they can provide two different power flow modes, they can meet only the high efficiency requirements under parts of working conditions, but can not take into account speed, traction and high efficiency at the same time under many working conditions.

SUMMARY OF THE INVENTION

The main technical problem solved by the present disclosure is to provide an electric drive axle and an electric vehicle, wherein an innovative structural design layout of the transmission system is provided. Through the coupling gear mechanism, the two transmission modules in the front and rear of the axle housing are effectively combined, and a gear transmission system with multiple gears is formed, so as to realize a variety of power flow transmission modes, which can cooperate with the motor, and be applied to the electric drive axle assembly of commercial vehicles, so that electric commercial vehicles can obtain the optimal balance of speed, traction and efficiency, and meet maximally the requirements of traction, speed and efficiency in various working conditions such as light duty, heavy duty, flat road operation and ramp operation, so as to reduce energy consumption and increase efficiency.

In order to solve the above technical problems, a technical solution adopted in the present disclosure is to provide an electric drive axle, which includes a driving assembly, a power coupling gear, a first gear transmission assembly, a second gear transmission assembly and two half shafts connected by a differential, and the driving assembly is used to drive the differential; wherein, the driving assembly comprises a motor and a planetary gear mechanism connected to the motor in a transmission way, the power coupling gear is arranged on a corresponding one of the two half shafts, and the planetary gear mechanism is connected to the first gear transmission assembly through the power coupling gear in a transmission way;

when the electric drive axle is in a first transmission mode, the first gear transmission assembly is connected to the differential in a transmission way; and when the electric drive axle is in a second transmission mode, the planetary gear mechanism is connected to the second gear transmission assembly in a transmission way, the second gear transmission assembly is connected to the differential in a transmission way, and the transmission between the first gear transmission assembly and the differential is disconnected.

In a preferred embodiment of the present disclosure, the driving assembly further comprises a first sliding sleeve (dog-clutch) shifting mechanism, and the first sliding sleeve shifting mechanism is fixedly arranged on a planet carrier of the planetary gear mechanism; when the electric drive axle is in the first transmission mode, the transmission between the first sliding sleeve shifting mechanism and the second gear transmission assembly is disconnected; and when the electric drive axle is in the second transmission mode, the first sliding sleeve shifting mechanism is connected to the second gear transmission assembly in a transmission way.

In a preferred embodiment of the present disclosure, the driving assembly and the first gear transmission assembly are respectively arranged on opposite sides of the power coupling gear.

In a preferred embodiment of the present disclosure, the planet carrier of the planetary gear mechanism is provided with a first gear meshing with the power coupling gear; the first gear transmission assembly comprises a countershaft, the countershaft is provided with a second gear meshing with the power coupling gear, the countershaft is further provided with a third gear and a fourth gear, and the half shafts are provided with a fifth gear and a sixth gear connected to the differential; when the electric drive axle is in the first transmission mode, the third gear is connected to the fifth gear in a transmission way, or the fourth gear is connected to the sixth gear in a transmission way.

In a preferred embodiment of the present disclosure, the electric drive axle further comprises a second sliding sleeve shifting mechanism slidably sleeved on the countershaft, when the electric drive axle is in the first transmission mode, the second sliding sleeve shifting mechanism is connected to the third gear in a transmission way, or the second sliding sleeve shifting mechanism is connected to the fourth gear in a transmission way.

In a preferred embodiment of the present disclosure, the second gear transmission assembly comprises a seventh gear and an eighth gear arranged on the half shafts and connected to the differential, and the seventh gear is arranged on an output shaft of the motor;

when the electric drive axle is in the second transmission mode, the seventh gear is connected to the eighth gear in a transmission way.

In a preferred embodiment of the present disclosure, the power coupling gear comprises a large gear and a small gear, the large gear meshes with the first gear, and the small gear meshes with the second gear.

In a preferred embodiment of the present disclosure, the electric drive axle further comprises a shift control unit electrically connected to the first sliding sleeve shifting mechanism and the second sliding sleeve shifting mechanism, in the first transmission mode, the shift control unit is used to control a sliding sleeve of the second sliding sleeve shifting mechanism to be connected to the third gear or the fourth gear in a transmission way, and in the second transmission mode, the shift control unit is used to control a sliding sleeve of the first sliding sleeve shifting mechanism to be connected to the second gear transmission assembly in a transmission way and control the transmission between the sliding sleeve of the second sliding sleeve shifting mechanism and the third gear or the fourth gear to be disconnected.

In a preferred embodiment of the present disclosure, the fifth gear and the sixth gear are arranged on one of the two half shafts, and the eighth gear and the power coupling gear are arranged on the other one of the two half shafts.

In order to solve the above technical problems, a technical solution adopted in the present disclosure is to provide an electric vehicle, which comprises the electric drive axle mentioned above.

The beneficial effects of the present disclosure are: the electric drive axle and the electric vehicle provided by the present disclosure can realize 3 shifting speeds, so that the electric drive axle can realize various power output modes, and can flexibly respond to various application conditions of the vehicle. It is especially suitable for commercial vehicles with a wide range of load fluctuations and various and complex working conditions. The electric drive axle with multiple speeds is applied to electric commercial vehicles to provide up to 3 speeds, which can not only meet the requirements of the maximum traction force of the electric commercial vehicle when climbing a slope, but also meet the requirements of the maximum speed.

DETAILED DESCRIPTION OF THE INVENTION

Figure 1:
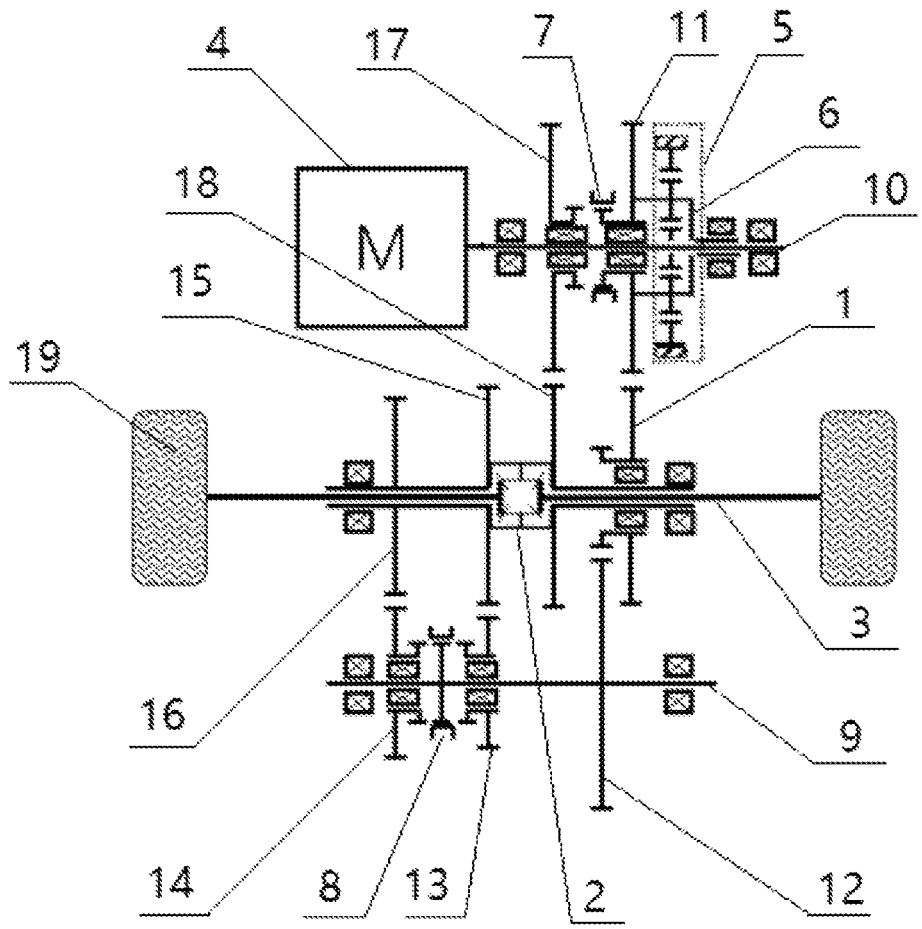
FIG. 1 is a schematic structural diagram of a preferred embodiment of an electric drive bridge of the present disclosure.

The preferred embodiments of the present disclosure will be described in detail below with reference to the accompanying drawings, so that the advantages and features of the present disclosure can be more easily understood by those skilled in the art, and the protection scope of the present disclosure can be more clearly defined.

An electric drive axle includes a driving assembly, a power coupling gear 1, a first gear transmission assembly, a second gear transmission assembly and two half shafts 3 connected by a differential 2, and the driving assembly is used to drive the differential 2.

The driving assembly includes a motor 4 and a planetary gear mechanism 5 connected to the motor 4 in a transmission way. The power coupling gear 1 is arranged on one of the two half shafts 3, and the planetary gear mechanism 5 is connected to the first gear transmission assembly in a transmission way through the power coupling gear 1. The planet carrier 6 of the planetary gear mechanism 5 is provided with a first gear 11 meshing with the power coupling gear 1. The planetary gear mechanism 5 can achieve the effect of deceleration and torque increase; the first gear 11 and the planet carrier 6 of the planetary gear mechanism 5 are fixedly connected, and the power can be transmitted to the power coupling gear 1 through the first gear 11.

When in the first shifting speed and the second shifting speed, the electric drive axle is in the first transmission mode, and the first gear transmission assembly is connected to the differential 2 in a transmission way; when in the third shifting speed, the electric drive axle is in the second transmission mode, the planetary gear mechanism 5 is connected to the second gear transmission assembly in a transmission way, the second gear transmission assembly is connected to the differential 2 in a transmission way, and the transmission between the first gear transmission assembly and the differential 2 is disconnected.

In some embodiments, the above-mentioned driving assembly further includes a first sliding sleeve shifting mechanism 7, and the first sliding sleeve shifting mechanism 7 is fixedly arranged on the planet carrier 6 of the planetary gear mechanism 5. When the electric drive axle is in the first transmission mode, the transmission between the first sliding sleeve shifting mechanism 7 and the second gear transmission assembly is disconnected; and when the electric drive axle is in the second transmission mode, the first sliding sleeve shifting mechanism 7 is connected to the second gear transmission assembly in a transmission way. Power transmission in two directions is achieved through the first sliding sleeve shifting mechanism 7.

In this embodiment, the driving assembly and the first gear transmission assembly are respectively arranged on opposite sides of the power coupling gear 1, which forms a relatively balanced arrangement, and realizes the multi-speed shifting function.

The first gear transmission assembly includes a countershaft 9, the countershaft 9 is provided with a second gear 12 meshing with the power coupling gear 1, the countershaft 9 is further provided with a third gear 13 and a fourth gear 14, and the half shaft 3 is provided with a fifth gear 15 and a sixth gear 16 connected to the differential 2.

When the electric drive axle is in the first transmission mode, the third gear 13 is connected to the fifth gear 15 in a transmission way or the fourth gear 14 is connected to the sixth gear 16 in a transmission way. The gear pair consisting of the third gear 13 and the fifth gear 15 forms the first shifting speed, and the gear pair consisting of the fourth gear 14 and the sixth gear 16 forms the second shifting speed.

The first gear transmission assembly further includes a second sliding sleeve shifting mechanism 8 slidably sleeved on the countershaft 9. When the electric drive axle is in the first transmission mode, the second sliding sleeve shifting mechanism 8 is connected to the third gear 13 in a transmission way, or the second sliding sleeve shifting mechanism 8 is connected to the fourth gear 14 in a transmission way, such that switching between different speeds is realized through the second sliding sleeve shifting mechanism 8.

The second gear transmission assembly includes a seventh gear 17 and an eighth gear 18 arranged on the half shaft 3 and connected to the differential 2. The seventh gear 17 is arranged on an output shaft 10 of the motor 4. When the electric drive axle is in the second transmission mode, the seventh gear 17 is connected to the eighth gear 18 in a transmission way. The gear pair consisting of the seventh gear 17 and the eighth gear 18 forms the third shifting speed.

The electric drive axle forms two power transmission routes: one of them is that the power is transmitted to the power coupling gear 1 through the first gear 11, and then transmitted to the third gear 13 and the fourth gear 14 as well as the fifth gear 15 and the sixth gear 16, which forms gear sets respectively and forms the power output in the first shifting speed and the second shifting speed; the other power transmission route is that the power is transmitted to the eighth gear 18 through the seventh gear 17 so as to form the power output of the third shifting speed; and the power of the two power transmission routes will be transmitted to the two half shafts 3 and finally transmitted to the wheels 19 connected with the half shafts so as to realize motor power drive.

Further, the power coupling gear 1 includes a large gear and a small gear, the large gear is meshed with the first gear 11, and the small gear is meshed with the second gear 12. The fifth gear 15 and the sixth gear 16 are arranged on one of the two half shafts 3, and the eighth gear 18 and the power coupling gear 1 are arranged on the other one of the two half shafts 3.

Figure 2:
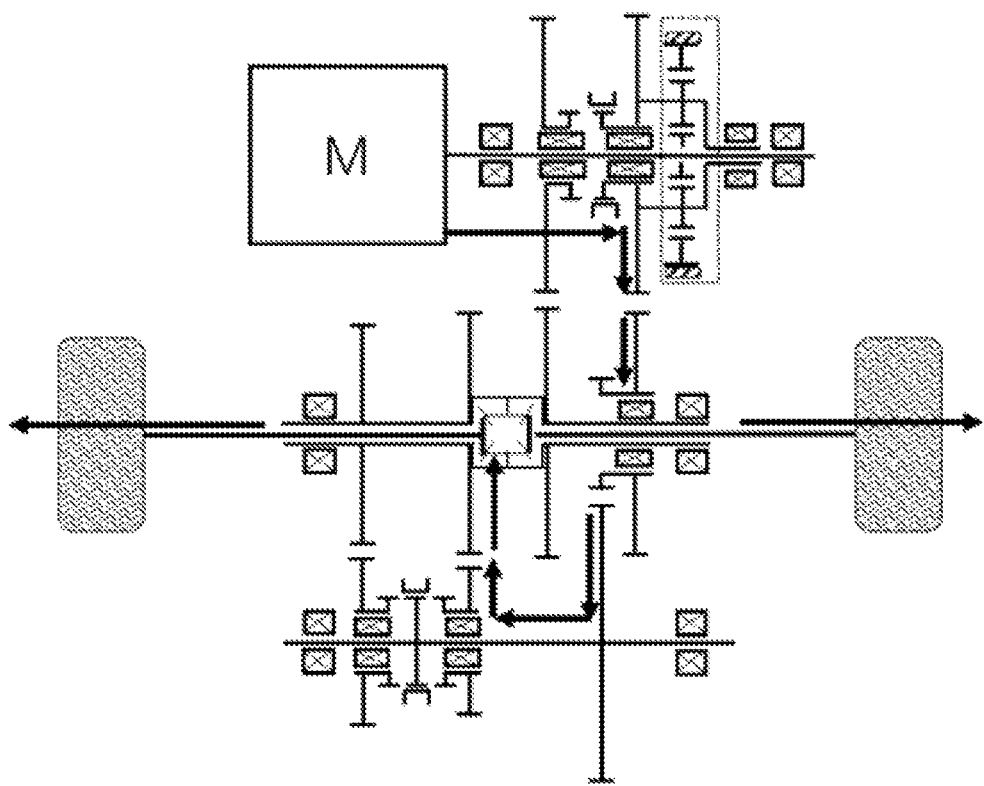
FIG. 2 is the power transmission route map in the first speed of the electric drive axle.

Referring to the power transmission route map in the first shifting speed shown in FIG. 2, in this speed, the power input by the motor 4 is transmitted to the power coupling gear 1 through the first gear 11, and then transmitted to the countershaft 9 through the second gear 12 meshing with the power coupling gear 1, and then transmitted to the third gear 13 and the fifth gear 15 through the second sliding sleeve shifting mechanism 8 to form the first shifting speed, and the power is transmitted to the differential 2, and then output to the wheels 19 through the two half shafts 3.

Figure 3:
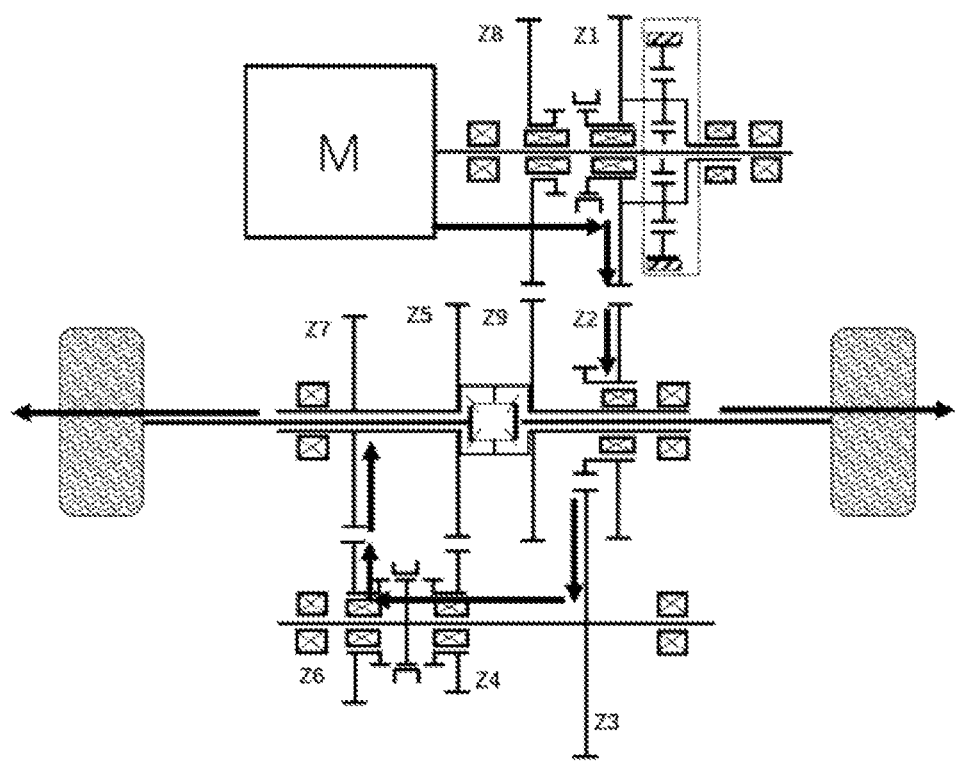
FIG. 3 is the power transmission route map in the second speed of the electric drive axle.

Referring to the power transmission route map in the second shifting speed shown in FIG. 3, in this speed, the power input by the motor 4 is transmitted to the power coupling gear 1 through the first gear 11, transmitted to the second gear 12 and the shaft 9, and then transmitted to the fourth gear 14 and the sixth gear 16 through the second sliding sleeve shifting mechanism 8 to form the second shifting speed, and the power is transmitted to the differential 2, and then output to the wheels 19 through the two half shafts 3.

Figure 4:
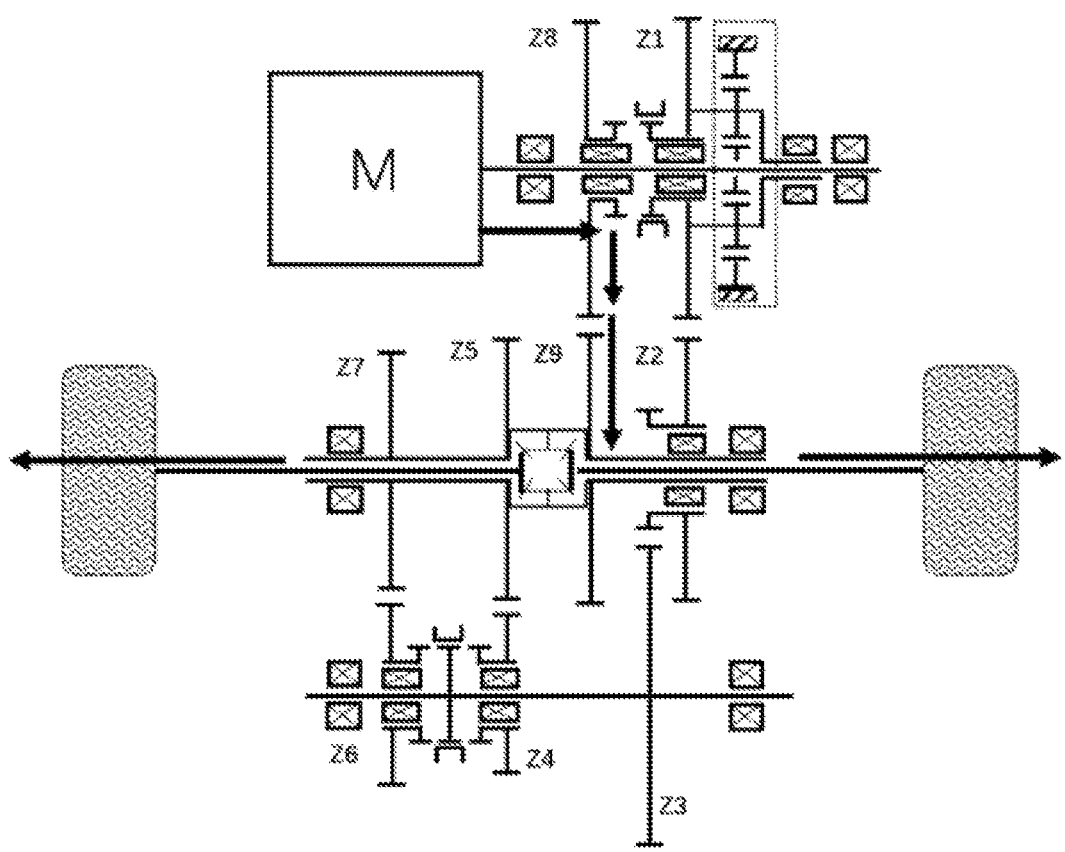
FIG. 4 is the power transmission route map in the third speed of the electric drive axle.

Referring to the power transmission route map in the third shifting speed shown in FIG. 4, in this speed, the power input by the motor 4 is transmitted to the differential 2 through the planetary gear mechanism 5, the first sliding sleeve shifting mechanism 7, the seventh gear 17, and the eighth gear 18, and then output to the wheels 19 through the two half shafts 3.

In this embodiment, the electric drive axle further includes a shift control unit electrically connected to the first sliding sleeve shifting mechanism 7 and the second sliding sleeve shifting mechanism 8. In the first transmission mode, the shift control unit is used to control the sliding sleeve of the second sliding sleeve shifting mechanism 8 to be connected to the third gear 13 or the fourth gear 14 in a transmission way, and in the second transmission mode, the shift control unit is used to control the sliding sleeve of the first sliding sleeve shifting mechanism 7 to be connected to the second gear transmission assembly in a transmission way and control the transmission between the sliding sleeve of the second sliding sleeve shifting mechanism 8 and the third gear 13 and the fourth gear 14 to be disconnected. It is easy to conduct the operation of controlling the sliding shifts of the first sliding sleeve shifting mechanism 7 and the second sliding sleeve shifting mechanism 8 by the shift control unit.

When the first sliding sleeve shifting mechanism 7 does not slide, the power is transmitted to the power coupling gear 1 through the first gear 11 to realize one power transmission route; when the first sliding sleeve shifting mechanism 7 slides, the first gear 11 and the seventh gear 17 are meshed to form another power transmission route. The first gear 11 is always meshed with the power coupling gear 1; and the seventh gear 17 and the eighth gear 18 are meshed to form the third shifting speed. The power transmitted from the second gear transmission assembly is transmitted to the countershaft 9 through the second gear 12. Under the action of the second sliding sleeve shifting mechanism 8, the output is formed through the third gear 13 and the fourth gear 14 respectively, and the third gear 13 and the fifth gear 15 form the first shifting speed, the fourth gear 14 and the sixth gear 16 form the second shifting speed.

The beneficial effects of the electric drive bridge provided by the present disclosure are:
1. The planetary gear mechanism can achieve a large multiple of deceleration and torque increase, which optimizes the match of the speed ratio in each shifting speed; there is a structural innovation between the first gear and the seventh gear, and the first sliding sleeve shifting mechanism is optimized to achieve power transmission routes in both directions;
2. The first gear transmission assembly is provided with a third gear and a fourth gear, and a second sliding sleeve shifting mechanism is arranged between the third gear and the fourth gear, which can realize the power transmission in two shifting speeds;
3. Set up a power coupling gear, which is provided as a combination of two gears, one large and one small, the large gear is meshed with the first gear, and the small gear is meshed with the second gear, which can configure a required wide range of speed ratios, so as to achieve the required electric drive axle transmission speed ratio of the commercial vehicles in the effective layout space.

The present disclosure also provides an electric vehicle including the above-mentioned electric drive axle. The disclosed multi-speed transmission system can be applied to the electric drive axle assembly of commercial vehicles, and can also be applied to the electric drive axle of other transportation vehicles with similar functions to electric commercial vehicles.

To sum up, the electric drive axle and the electric vehicle provided by the present disclosure can choose to set different specific speed ratios according to different vehicles, different working conditions and loads, so as to realize the optimal power and torque transmission of the vehicle and satisfy the requirements of the vehicles for traction, speed and efficiency, so as to achieve the lowest vehicle energy consumption requirements.

The above descriptions are only the embodiments of the present disclosure, and are not intended to limit the scope of the present disclosure. Any equivalent structure or equivalent process transformation made by using the contents of the description and drawings of the present disclosure, or the contents directly or indirectly applied to other related technical fields, are similarly included in the patent protection scope of the present disclosure.

The invention claimed is:
1. An electric drive axle, comprising: a driving assembly, a power coupling gear, a first gear transmission assembly, a second gear transmission assembly and two half shafts connected by a differential, and the driving assembly is used to drive the differential; wherein,
the driving assembly comprises a motor and a planetary gear mechanism connected to the motor in a transmission connection, the power coupling gear is arranged on a corresponding one of the two half shafts, and the planetary gear mechanism is connected to the first gear transmission assembly in a transmission connection through the power coupling gear;
when the electric drive axle is in a first transmission mode, the first gear transmission assembly is connected to the differential in a transmission connection; and
when the electric drive axle is in a second transmission mode, the planetary gear mechanism is connected to the second gear transmission assembly in a transmission connection, the second gear transmission assembly is connected to the differential in a transmission connection, and a transmission connection between the transmission connect between the first gear transmission assembly and the differential is disconnected.

2. The electric drive axle according to claim 1, wherein the driving assembly further comprises a first sliding sleeve shifting mechanism, and the first sliding sleeve shifting mechanism is fixedly arranged on a planet carrier of the planetary gear mechanism;
 when the electric drive axle is in the first transmission mode, a transmission connection between the first sliding sleeve shifting mechanism and the second gear transmission assembly is disconnected; and
 when the electric drive axle is in the second transmission mode, the first sliding sleeve shifting mechanism is connected to the second gear transmission assembly in the transmission connection.

3. The electric drive axle according to claim 1, wherein the driving assembly and the first gear transmission assembly are respectively arranged on opposite sides of the power coupling gear.

4. The electric drive axle according to claim 1, wherein the planet carrier of the planetary gear mechanism is provided with a first gear meshing with the power coupling gear;
 the first gear transmission assembly comprises a countershaft, the countershaft is provided with a second gear meshing with the power coupling gear, the countershaft is further provided with a third gear and a fourth gear, and the half shafts are provided with a fifth gear and a sixth gear connected to the differential;
 when the electric drive axle is in the first transmission mode, the third gear is connected to the fifth gear in a transmission connection, or the fourth gear is connected to the sixth gear in a transmission connection.

5. The electric drive axle according to claim 4, further comprising a second sliding sleeve shifting mechanism slidably sleeved on the countershaft, when the electric drive axle is in the first transmission mode, the second sliding sleeve shifting mechanism is connected to the third gear in a transmission connection, or the second sliding sleeve shifting mechanism is connected to the fourth gear in a transmission connection.

6. The electric drive axle according to claim 4, wherein the power coupling gear comprises a large gear and a small gear, the large gear meshes with the first gear, and the small gear meshes with the second gear.

7. The electric drive axle according to claim 4, wherein the electric drive axle further comprises a shift control unit electrically connected to the first sliding sleeve shifting mechanism and the second sliding sleeve shifting mechanism, in the first transmission mode, the shift control unit is used to control a sliding sleeve of the second sliding sleeve shifting mechanism to be connected to the third gear or the fourth gear in a transmission connection, and
 in the second transmission mode, the shift control unit is used to control a sliding sleeve of the first sliding sleeve shifting mechanism to be connected to the second gear transmission assembly in a transmission connection, and control the transmission connection between the sliding sleeve of the second sliding sleeve shifting mechanism and the third gear or the fourth gear to be disconnected.

8. The electric drive axle according to claim 4, wherein the fifth gear and the sixth gear are arranged on one of the two half shafts, and an eighth gear and the power coupling gear are arranged on the other one of the two half shafts.

9. The electric drive axle according to claim 1, wherein the second gear transmission assembly comprises a seventh gear and an eighth gear arranged on the half shafts and connected to the differential, and the seventh gear is arranged on an output shaft of the motor;
 when the electric drive axle is in the second transmission mode, the seventh gear is connected to the eighth gear in a transmission connection.

10. An electric vehicle, comprising the electric drive axle according to claim 1.

11. The electric vehicle according to claim 10, wherein the driving assembly further comprises a first sliding sleeve shifting mechanism, and the first sliding sleeve shifting mechanism is fixedly arranged on a planet carrier of the planetary gear mechanism;
 when the electric drive axle is in the first transmission mode, a transmission connection between the first sliding sleeve shifting mechanism and the second gear transmission assembly is disconnected; and
 when the electric drive axle is in the second transmission mode, the first sliding sleeve shifting mechanism is connected to the second gear transmission assembly in the transmission connection.

12. The electric vehicle according to claim 10, wherein the driving assembly and the first gear transmission assembly are respectively arranged on opposite sides of the power coupling gear.

13. The electric vehicle according to claim 10, wherein the planet carrier of the planetary gear mechanism is provided with a first gear meshing with the power coupling gear;
 the first gear transmission assembly comprises a countershaft, the countershaft is provided with a second gear meshing with the power coupling gear, the countershaft is further provided with a third gear and a fourth gear, and the half shafts are provided with a fifth gear and a sixth gear connected to the differential;
 when the electric drive axle is in the first transmission mode, the third gear is connected to the fifth gear in a transmission connection, or the fourth gear is connected to the sixth gear in a transmission connection.

14. The electric vehicle according to claim 13, wherein the electric drive axle further comprises a second sliding sleeve shifting mechanism slidably sleeved on the countershaft, when the electric drive axle is in the first transmission mode, the second sliding sleeve shifting mechanism is connected to the third gear in a transmission connection, or the second sliding sleeve shifting mechanism is connected to the fourth gear in a transmission connection.

15. The electric vehicle according to claim 13, wherein the power coupling gear comprises a large gear and a small gear, the large gear meshes with the first gear, and the small gear meshes with the second gear.

16. The electric vehicle according to claim 13, wherein the electric drive axle further comprises a shift control unit electrically connected to the first sliding sleeve shifting mechanism and the second sliding sleeve shifting mechanism, in the first transmission mode, the shift control unit is used to control a sliding sleeve of the second sliding sleeve shifting mechanism to be connected to the third gear or the fourth gear in a transmission connection, and
 in the second transmission mode, the shift control unit is used to control a sliding sleeve of the first sliding sleeve shifting mechanism to be connected to the second gear transmission assembly in a transmission connection, and control the transmission connection between the sliding sleeve of the second sliding sleeve shifting mechanism and the third gear or the fourth gear to be disconnected.

17. The electric vehicle according to claim 13, wherein the fifth gear and the sixth gear are arranged on one of the two half shafts, and an eighth gear and the power coupling gear are arranged on the other one of the two half shafts.

18. The electric vehicle according to claim 10, wherein the second gear transmission assembly comprises a seventh gear and an eighth gear arranged on the half shafts and connected to the differential, and the seventh gear is arranged on an output shaft of the motor;

when the electric drive axle is in the second transmission mode, the seventh gear is connected to the eighth gear in a transmission connection.

* * * * *